United States Patent
Smith et al.

(10) Patent No.: US 10,563,614 B2
(45) Date of Patent: Feb. 18, 2020

(54) COMPOSITE TRANSLATING COWL ASSEMBLY FOR A THRUST REVERSER SYSTEM

(71) Applicant: HONEYWELL INTERNATIONAL INC., Morris Plains, NJ (US)

(72) Inventors: Danis Burton Smith, Chandler, AZ (US); Patrick S. Mulloy, Chandler, AZ (US); Shawn Alstad, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 822 days.

(21) Appl. No.: 15/238,959

(22) Filed: Aug. 17, 2016

(65) Prior Publication Data

US 2018/0051653 A1   Feb. 22, 2018

(51) Int. Cl.
  *F02K 1/62* (2006.01)
  *F02K 1/72* (2006.01)

(52) U.S. Cl.
  CPC ............... *F02K 1/625* (2013.01); *F02K 1/72* (2013.01); *F05D 2250/71* (2013.01); *F05D 2300/603* (2013.01); *Y02T 50/672* (2013.01)

(58) Field of Classification Search
  CPC ........ F02K 1/625; F02K 1/72; F05D 2250/71; F05D 2300/603
  See application file for complete search history.

(56) References Cited

U.S. PATENT DOCUMENTS

| | | | |
|---|---|---|---|
| 2,950,595 A * | 8/1960 | Laucher | F02K 1/625 239/265.31 |
| 3,050,937 A | 8/1962 | James et al. | |
| 3,262,270 A | 7/1966 | Beavers | |
| 3,434,666 A | 3/1969 | Shaw | |
| 3,492,821 A | 2/1970 | Monaghan et al. | |
| 3,500,645 A * | 3/1970 | Hom | F02K 1/72 239/265.29 |
| 3,614,028 A * | 10/1971 | Kleckner | B64C 9/20 244/15 |
| 3,616,648 A | 11/1971 | Weise | |
| 3,684,183 A | 8/1972 | Baerresen | |

(Continued)

FOREIGN PATENT DOCUMENTS

| | | |
|---|---|---|
| DE | 1287444 | 1/1969 |
| GB | 764907 | 1/1957 |
| WO | 2014092757 A1 | 6/2014 |

OTHER PUBLICATIONS

Extended EP Search Report for Application No. 16164137.8-1607 dated Sep. 15, 2016.

(Continued)

*Primary Examiner* — Jesse S Bogue
(74) *Attorney, Agent, or Firm* — Lorenz & Kopf, LLP

(57) ABSTRACT

An improved translating cowl (transcowl) assembly for a thrust reverser system for a turbine engine is provided. The transcowl assembly comprises an outer skin comprised of a first composite material and an inner skin comprised of a second composite material. The inner skin is configured to couple circumferentially within the outer skin, and creates a flow path for engine exhaust flow. The inner skin comprises a contoured depression configured to provide clearance for movement of a blocker door. A metallic bracket is disposed between the inner skin and outer skin.

15 Claims, 9 Drawing Sheets

(56) References Cited

U.S. PATENT DOCUMENTS

| | | | |
|---|---|---|---|
| 3,690,561 A | | 9/1972 | Potter |
| 3,837,411 A | | 9/1974 | Nash et al. |
| 4,183,478 A | | 1/1980 | Rudolph |
| 4,185,798 A | * | 1/1980 | Dickenson .............. F02K 1/605 239/265.29 |
| 4,340,178 A | | 7/1982 | Lawson |
| 4,533,098 A | | 8/1985 | Bonini et al. |
| 4,790,495 A | | 12/1988 | Greathouse et al. |
| 4,826,106 A | * | 5/1989 | Anderson ............ B29D 24/007 181/214 |
| 5,054,285 A | * | 10/1991 | Geidel ..................... F02K 1/72 239/265.39 |
| 5,103,634 A | | 4/1992 | Harrison et al. |
| 5,251,435 A | | 10/1993 | Pauley |
| 5,476,237 A | | 12/1995 | Clarke |
| 5,806,302 A | * | 9/1998 | Cariola ..................... F02K 1/09 239/265.29 |
| 5,927,647 A | | 7/1999 | Masters et al. |
| 6,151,885 A | * | 11/2000 | Metezeau ............... F02K 1/605 239/265.29 |
| 6,262,269 B1 | | 7/2001 | Hayes et al. |
| 6,311,928 B1 | | 11/2001 | Presz, Jr. et al. |
| 8,398,017 B2 | | 3/2013 | Welch |
| 2007/0007388 A1 | * | 1/2007 | Harrison ................... F02K 1/72 244/110 B |
| 2014/0027537 A1 | * | 1/2014 | Binks ....................... F02K 1/09 239/265.35 |
| 2015/0098810 A1 | | 4/2015 | Soria et al. |
| 2015/0107222 A1 | * | 4/2015 | Aten ........................ F02K 1/70 60/226.2 |
| 2015/0204272 A1 | * | 7/2015 | James ....................... F02K 1/72 239/265.19 |
| 2015/0308380 A1 | | 10/2015 | Biset |
| 2016/0201600 A1 | | 7/2016 | Charron et al. |

OTHER PUBLICATIONS

USPTO Office Action for U.S. Appl. No. 14/688,779 dated Sep. 21, 2017.

Smith, D. B. et al; System and method for reducing idle thrust in a translating cowl thrust reverser; Filed with the USPTO on Sep. 10, 2015 and assigned U.S. Appl. No. 14/850,348.

Smith, D. B. et al; Single row vane assembly for a thrust reverser; Filed with the USPTO on Jan. 14, 2016 and assigned U.S. Appl. No. 14/995,396.

Smith, D. B. et al; Translating cowl thrust reverser that prevents unintended door rotation; Filed with the USPTO on Jan. 22, 2016 and assigned U.S. Appl. No. 15/004,020.

Smith, D. B. et al; Translating cowl thrust reverser having a pressure imbalance that reduces overall structural load; Filed with the USPTO on Jan. 18, 2016 and assigned U.S. Appl. No. 14/997,611.

Smith, D. B. et al; Thrust reverser with asymmetric vane geometry; Filed with the USPTO on Jan. 25, 2016 and assigned U.S. Appl. No. 15/005,357.

Smith, D. B. et al; Translating cowl thrust reverser system with over-stow unlocking capability; Filed with the USPTO on Feb. 9, 2016 and assigned U.S. Appl. No. 15/019,055.

Extended EP Search Report for Application No. 17184143.0-1607 dated Dec. 20, 2017.

USPTO Office Action for U.S. Appl. No. 14/688,779 dated May 16, 2017.

* cited by examiner

COMPOSITE TRANSLATING COWL ASSEMBLY FOR A THRUST REVERSER SYSTEM

TECHNICAL FIELD

The present invention relates to a thrust reverser system for a turbine engine, and more particularly to a composite translating cowl for a thrust reverser system.

BACKGROUND

When jet-powered aircraft land, the wheel brakes and the imposed aerodynamic drag loads (e.g., flaps, spoilers, etc.) of the aircraft may not be sufficient to achieve the desired stopping distance. Thus, turbine engines on most turbine-powered aircraft include thrust reverser systems. Thrust reverser systems enhance the stopping power of the aircraft by redirecting turbine engine exhaust airflow in order to generate reverse thrust.

Traditional thrust reverser systems have two distinct operating states: a forward (or stowed) state, wherein the thrust reverser system typically forms a portion a turbine engine nacelle and forward thrust nozzle; and a reverse (or deployed) state, wherein the thrust reverser system redirects at least a portion of the engine airflow forward and radially outward, to help decelerate the aircraft. The transition between the forward to the reverse state is typically achieved by translating a portion of the nacelle aft. The translating portion of the nacelle is often referred to as the translating cowl, or transcowl, and translating the transcowl aft creates an aperture in the nacelle. One or more internally located blocker doors synchronously deploy with the translation of the transcowl. The blocker doors obstruct forward thrust and generate reverse thrust that discharges through the aperture.

In the evolution of turbine engine development, weight and performance continue to be a significant consideration for all engine components. Consequently, improvements in turbine engine components in which the structural and performance requirements for a respective turbine engine design are met while reducing weight are desirable. The composite transcowl assembly provided is an improved transcowl design with the technical effects of meeting performance requirements while delivering reduced weight.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Provided is a translating cowl (transcowl) assembly for a thrust reverser system for a turbine engine, the transcowl assembly comprising: an outer skin comprised of a first composite material, the outer skin further comprising the characteristics of (i) being substantially continuous in both a circumferential direction and a longitudinal direction, (ii) an outer skin outer surface providing aerodynamic continuity with a nacelle, and (iii) an outer skin inner surface; an inner skin comprised of a second composite material and configured to provide an aerodynamic exit flow path for engine exhaust, the inner skin further comprising the characteristics of (i) an inner skin outer surface configured to couple circumferentially with the outer skin inner surface, (ii) an inner skin inner surface comprising a contoured depression configured to provide clearance for movement of a blocker door; and a metallic bracket disposed between the outer skin inner surface and the inner skin outer surface, and configured to (i) attach the outer skin to a thrust reverser actuation system, and (ii) distribute a structural load associated with the thrust reverser actuation system onto the outer skin.

A thrust reverser system for a turbine engine is also provided, the thrust reverser system comprising: a blocker door; an annular outer skin comprised of a first composite, the outer skin further comprising the characteristics of (i) being substantially continuous in both a circumferential direction and a longitudinal direction, (ii) an outer skin outer surface providing aerodynamic continuity with a nacelle, and (iii) an outer skin inner surface; an inner skin comprised of a second composite and configured to provide an aerodynamic exit flow path for engine exhaust, the inner skin further comprising an inner skin inner surface comprising a contoured depression configured to provide clearance for movement of the blocker door; wherein the inner skin is installed within the outer skin and the blocker door is coupled within the inner skin; and a metallic bracket disposed between the outer skin inner surface and the inner skin outer surface, and configured to attach the outer skin to a thrust reverser actuation system.

Also provided is a turbine engine comprising: a blocker door; and a translating cowl (transcowl) assembly for a thrust reverser system, the transcowl assembly comprising: an outer skin comprised of a first composite, the outer skin further comprising the characteristics of (i) a first radius and a first length, (ii) being substantially continuous in both a circumferential direction and a longitudinal direction, (iii) an outer skin outer surface providing aerodynamic continuity with a nacelle, and (iv) an outer skin inner surface; an inner skin comprised of a second composite and configured to provide an aerodynamic flow path for engine exhaust, the inner skin further comprising an inner skin inner surface comprising a contoured depression configured to provide clearance for movement of the blocker door; wherein the inner skin is installed within the outer skin and the blocker door is coupled within the inner skin; and a metallic bracket disposed between the outer skin inner surface and the inner skin outer surface.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
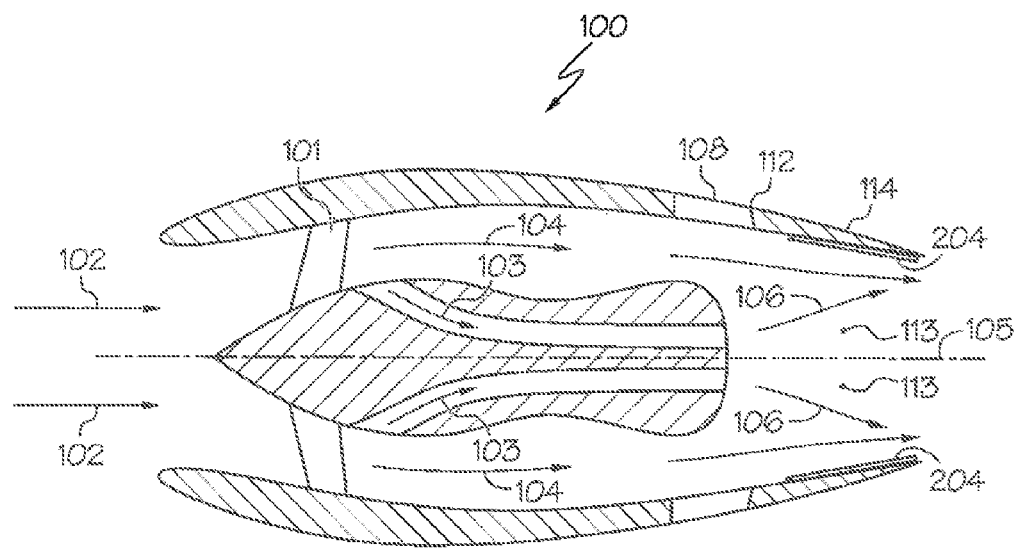
FIG. 1-FIG. 2 are perspective views of a first variation of a typical aircraft turbine engine with (i) a thrust reverser in a stowed position (FIG. 1), (ii) a thrust reverser in a deployed position (FIG. 2)

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

The turbine engine is a component of an aircraft's propulsion system that, in cooperation with the thrust reverser, generates thrust by means of an accelerating mass of gas. When the thrust reverser is in the forward thrust state with one or more blocker doors stowed, engine airflow moves from the forward end of the turbine engine to the aft end and is discharged as forward thrust. Alternatively, when the thrust reverser is in the reverse thrust state with the blocker doors deployed, the engine airflow is prevented from being discharged as forward thrust, and is instead discharged through an aperture, generating reverse thrust. As mentioned, the translating cowl (hereinafter "transcowl") is a key component in a thrust reverser system, and a focus of the present invention. FIGS. 1-4 are provided to illustrate operation of two common thrust reverser systems suitable for an aircraft turbine engine, and to orient a reader to the location of the transcowl and blocker doors within the thrust reverser system.

Various embodiments described hereinbelow are directed to a composite transcowl assembly for a thrust reverser system that is suitable for an aircraft turbine engine. As will be apparent from the detailed discussion below, various embodiments of the composite transcowl assembly advantageously provide contoured depressions that are customized to provide clearance of movement for respective blocker doors. The embodiments described below are merely examples and serve as a guide for implementing the novel systems and methods herein on any industrial, commercial, military, or consumer turbofan application. As such, the examples presented herein are intended as non-limiting.

Turning now to FIGS. 1-4, a turbine engine is substantially encased within an aerodynamically smooth outer covering, the nacelle 100. Nacelle 100 wraps around the turbine engine and forms an aerodynamically shaped cavity around an engine centerline 105, thereby providing an engine exhaust flow 106 when the aircraft is generating forward thrust. Ambient air 102 enters the turbine engine and passes through a fan 101. A portion of this air will be pressurized, mixed with fuel and ignited, generating hot gasses known as core flow 103. The remainder of this air bypasses the engine core and is known as fan flow 104. Hereinbelow, a combination of fan flow 104 and core flow 103 is described as the engine exhaust flow 106 that is discharged, generating forward thrust.

Nacelle 100 comprises a thrust reverser system with an annular composite transcowl assembly 114. Generally, a stationary structure 108 serves to mount the entire thrust reverser system to the turbine engine. An engine centerline 105 is depicted for reference. Although not a focus of the present invention, the stationary structure 108 has an annular shape and typically includes associated support beams to provide a rigid annular structure to which moveable thrust reverser components (described in detail below) may be mounted and/or may slidably engage. Accordingly, the composite transcowl assembly 114 may be mounted adjacent to the stationary structure 108 and extend aft therefrom, completing an exit flow path for the engine exhaust flow 106.

Figure 3:
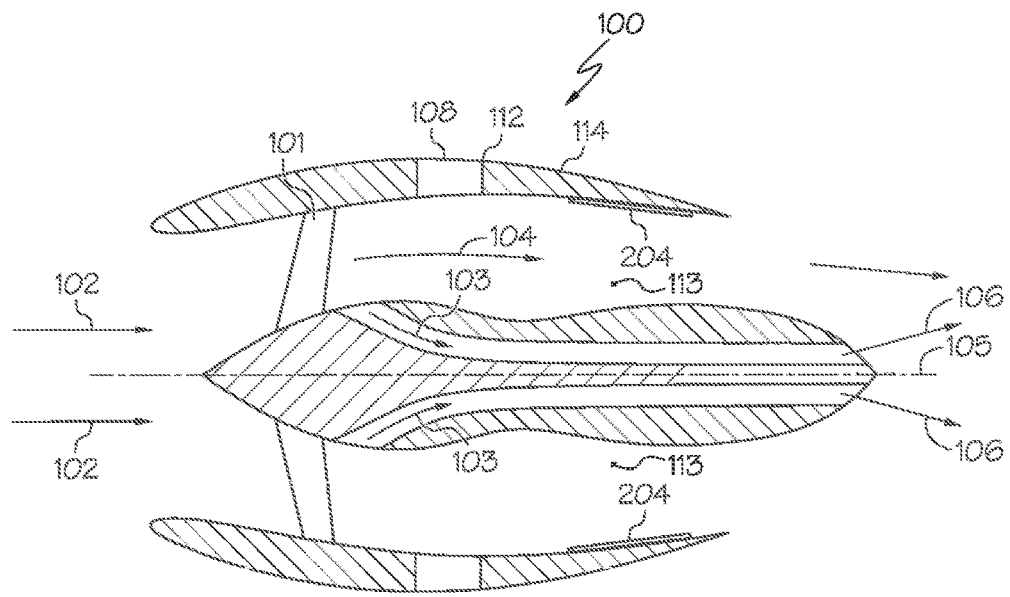
FIG. 3 and FIG. 4 are perspective views of a second variation of a typical aircraft turbine engine with (i) a thrust reverser in a stowed position (FIG. 3), (ii) a thrust reverser in a deployed position (FIG. 4).

In a forward thrust position of a general thrust reverser system, shown in FIGS. 1 and 3, a front edge 112 of the composite transcowl assembly 114 abuts with the stationary structure 108, creating a substantially smooth and continuous cavity for the engine exhaust flow 106, thereby generating forward thrust.

Figure 2:
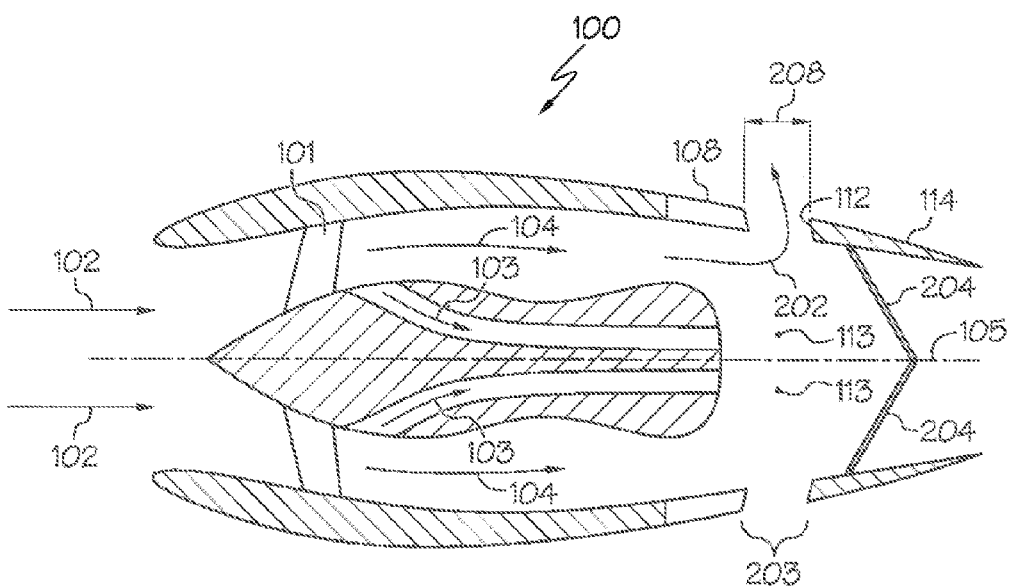
Figure 4:
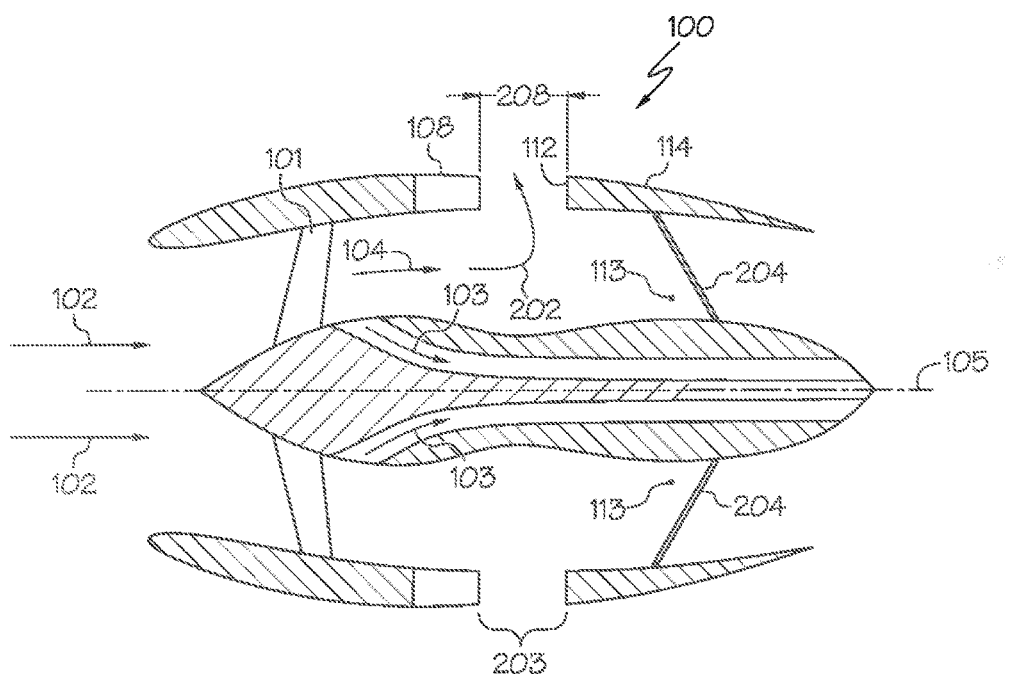

Generally, a thrust reverser system transitions or deploys to the reverse thrust position by translating the composite transcowl assembly 114 aft from the stationary structure 108 by a predetermined distance 208, creating a reverse flow aperture 203. FIGS. 2 and 4 depict thrust reverser systems in a reverse thrust position. Synchronously with the movement of the composite transcowl assembly 114, one or more blocker doors 204 pivot or rotate about a respective pivot axis 113, to obstruct some or all of the engine exhaust flow 106. Generally, the transition between the forward thrust position and the reverse thrust position occurs as a single, continuous motion. Each blocker door 204 is machined or manufactured to have a shape that permits it to obstruct engine exhaust flow 106 and redirect it forward when the blocker door 204 is in its deployed position. A reverse flow path 202 is created by the deployed composite transcowl assembly 114 and the blocker doors 204, generating reverse thrust.

Figure 14:
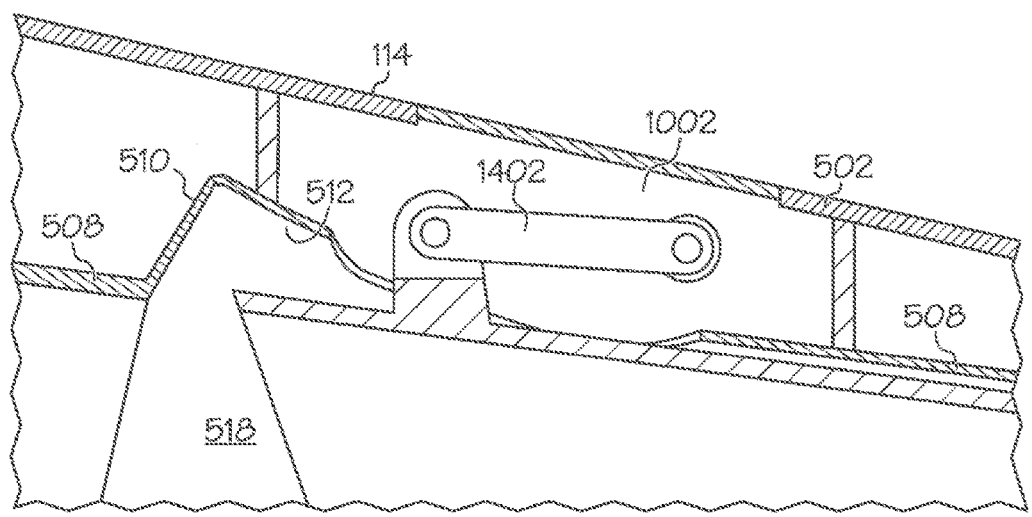
FIG. 14 is a partial cross sectional view showing placement of a metallic bracket used in association with a linkage rod, in accordance with various embodiments.

An actuation system is generally utilized to cause the composite transcowl assembly 114 to translate back and forth between the stowed (forward) position and the deployed (reverse) position and may be coupled to the composite transcowl assembly 114 so as to achieve coordinated and synchronous motion of the composite transcowl assembly 114 and the rotation of the blocker doors 204. In various embodiments described below, reference is made to actuation system components, such as an actuator (FIG. 5 actuator 516) and a linkage rod (FIG. 14 linkage rod 1402). One with skill in the art will readily appreciate that an actuation system may comprise different or additional mechanical and/or electrical components, and may be responsive to aircraft system commands.

As is readily observable in the thrust reverser system depicted in FIG. 3 and FIG. 4, the blocker doors 204, when deployed, close to the core of the turbine engine, rather than to the engine centerline, as in the thrust reverser system depicted in FIG. 1 and FIG. 2. For simplifying purposes, the novel ideas presented hereinbelow are depicted for an aircraft turbine engine having a thrust reverser system of the type shown in FIG. 1 and FIG. 2; however, it may be readily appreciated that the provided concepts easily adapt to the aircraft turbine engine depicted in FIG. 3 and FIG. 4, as well as to other variations of turbine engines and thrust reverser systems.

Figure 5:
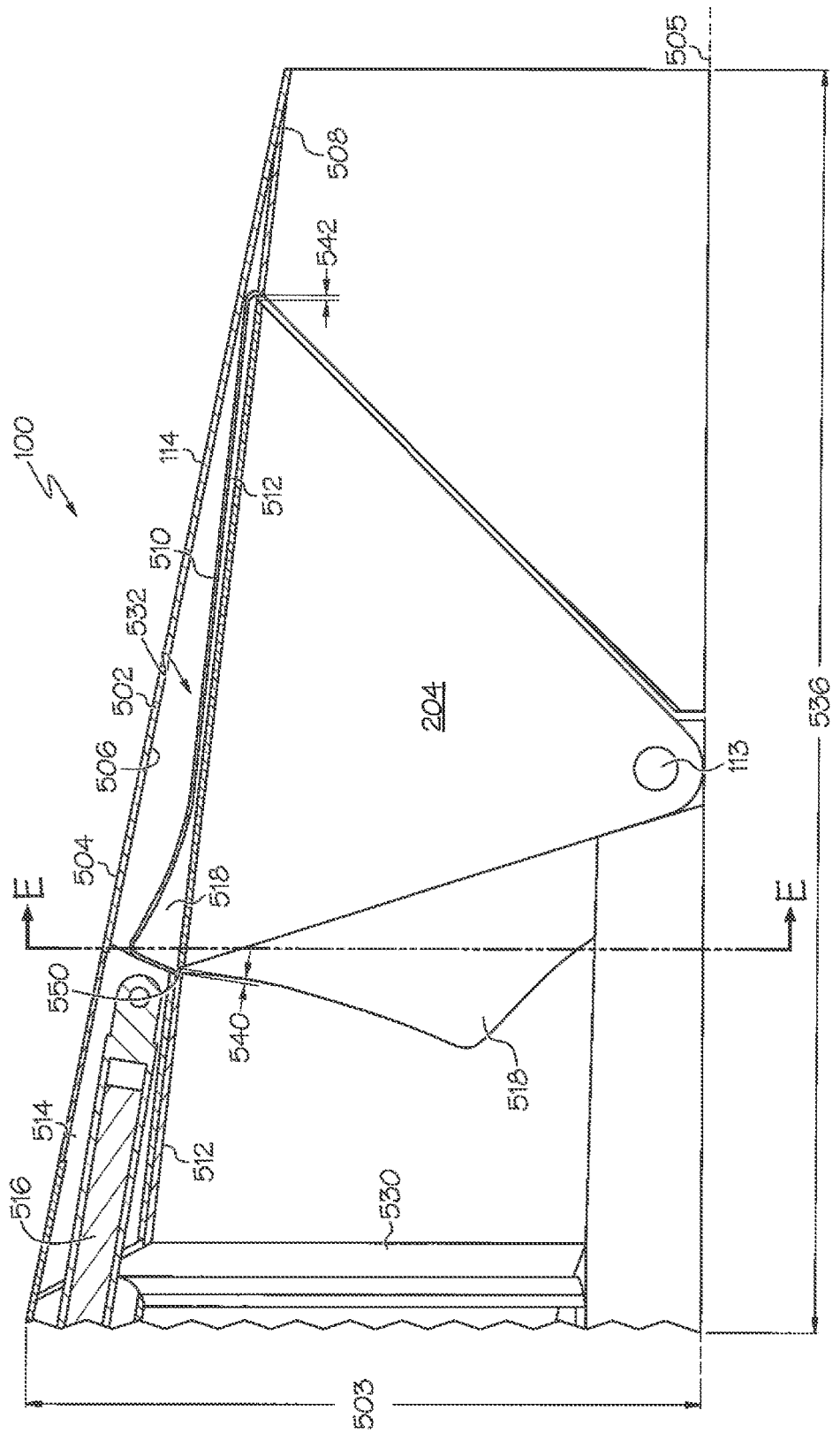
FIG. 5 is a partial cross sectional view, above a thrust reverser centerline, of a composite transcowl with a blocker door in a stowed position, in accordance with various embodiments.
Figure 12:
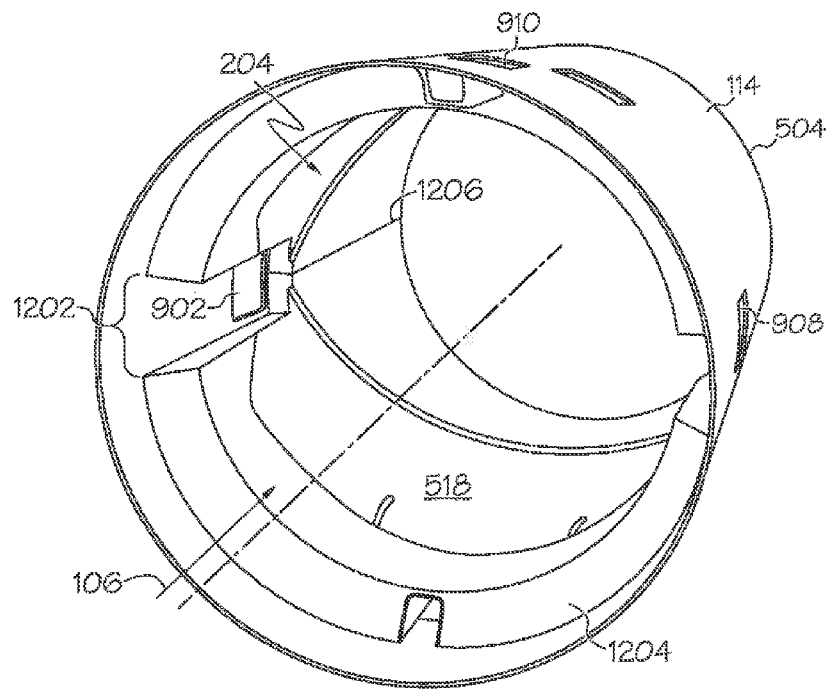
FIG. 12 is a three dimensional view showing an assembly of an outer skin and inner skin of the composite transcowl, in accordance with various embodiments.

FIG. 5 provides a partial cross sectional view, above a thrust reverser centerline 505 of the composite transcowl assembly 114 with a blocker door 204 in a stowed position, in accordance with various embodiments. The composite transcowl assembly 114 comprises several components: an outer skin 502, an inner skin 508, and a metallic bracket 514. The outer skin 502 provides an annular structure for the composite transcowl assembly 114 and surrounds inner skin 508. The metallic bracket 514, disposed between the outer skin inner surface 506 and the inner skin outer surface 510, is configured and located to distribute a structural load associated with a thrust reverser actuation system onto the outer skin 502, and to attach the outer skin 502 to the thrust reverser actuation system (shown via actuator 516). In some embodiments, a filler material 532 may be utilized to substantially fill space between the outer skin inner surface 506 and inner skin outer surface 510. In various embodiments, the composite transcowl assembly 114 further comprises a heat shield (FIG. 12 1204).

As shown in FIG. 5, the longitudinal extent of the outer skin 502 and of the inner skin 508 is substantially the length of the composite transcowl assembly 114. The outer skin outer surface 504 provides aerodynamic continuity with the remaining sections of the nacelle 100. The outer skin 502 forms a substantially cylindrical or frusto-conical cavity for receiving the inner skin 508. The outer skin 502, defined by outer skin outer surface 504 and outer skin inner surface 506, is comprised of a first composite material that enables the outer skin 502 to function as a primary load bearing portion of the composite transcowl assembly 114. The outer skin 502 further comprises the characteristic of being substantially continuous in both a circumferential direction and a longitudinal direction. As used herein, being substantially continuous means that there are no seams or joints that extend the entire length or the entire circumference of the outer skin 502. Accordingly, although the outer skin 502 is substantially continuous, the outer skin 502 may have one or more openings therethrough. The openings in the outer skin 502 are sized and located to provide manufacturing or maintenance access, as described in connection with FIG. 9.

As mentioned above, the inner skin 508 also extends substantially the length of the composite transcowl assembly 114, and of the outer skin 502. The inner skin 508 has a radius that is smaller than the radius of the outer skin 502, in order to install within the outer skin 502. In contrast to the outer skin 502, the inner skin 508 is substantially non-structural, acting as an aerodynamic fairing creating an exit flow path for the engine exhaust flow 106. Accordingly, inner skin 508 is comprised of a second composite material (different than the first composite material) that is selected to bear primarily aerodynamically induced loads. The inner skin 508 comprises an inner skin outer surface 510 and an inner skin inner surface 512. In contrast to the outer skin 502, the inner skin 508 may be segmented, or have seams or joints that extend the entire length or the entire circumference of the inner skin 508. When assembled, the installed inner skin 508 may comprise one or more segments abutted circumferentially or longitudinally within the cavity created by the outer skin 502; the resulting inner skin 508 is configured to couple circumferentially and longitudinally within the outer skin such that inner skin outer surface 510 couples to outer skin inner surface 506. As shown in FIG. 5, in some areas of the composite transcowl assembly 114, metallic brackets 514 and/or filler material 532 may be between outer skin inner surface 506 and inner skin outer surface 510.

Figure 6:
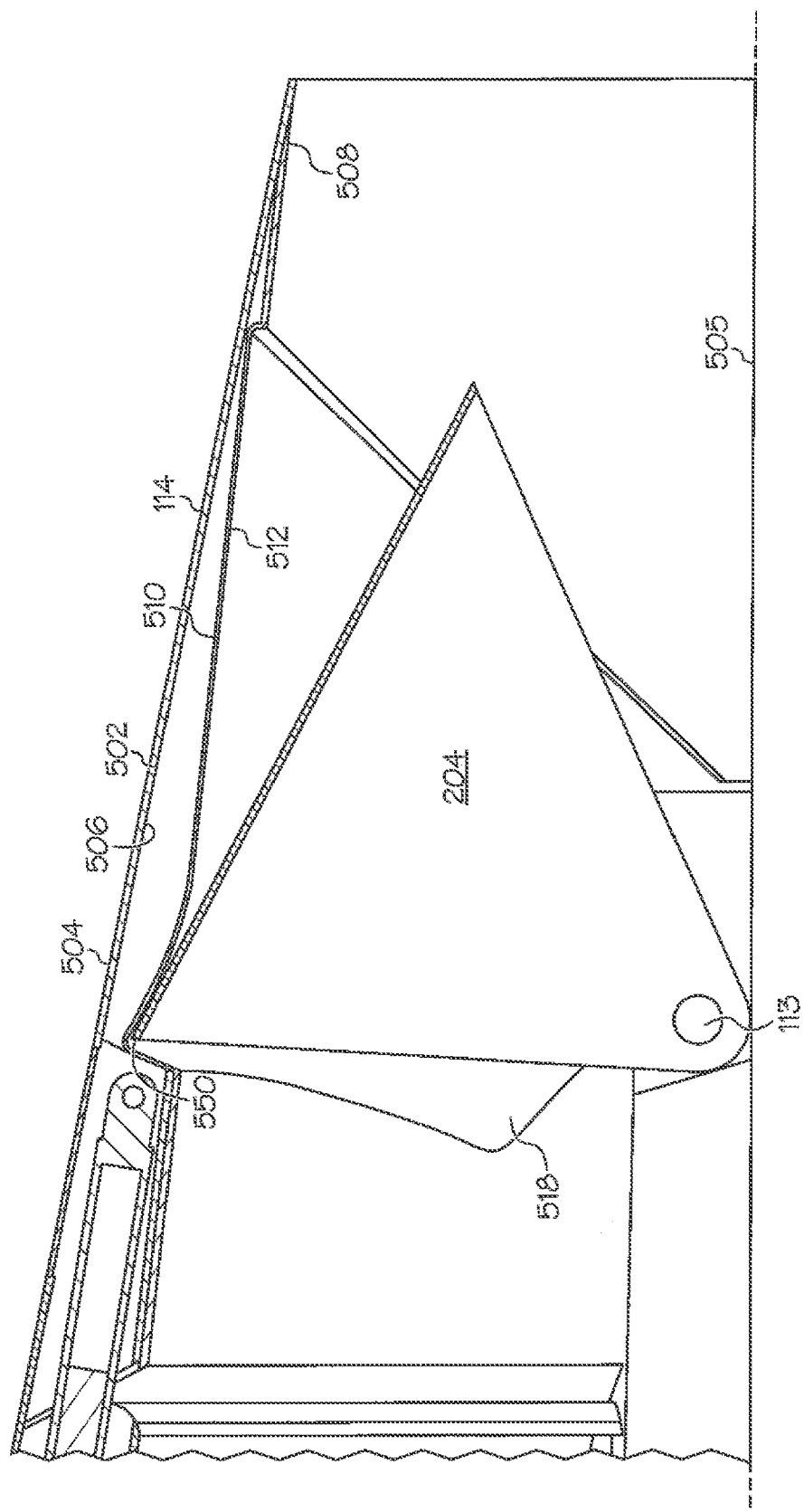
FIG. 6 is a partial cross sectional view, above the thrust reverser centerline, of the composite transcowl in FIG. 5 showing the blocker door in a partially deployed position, in accordance with various embodiments.
Figure 7:
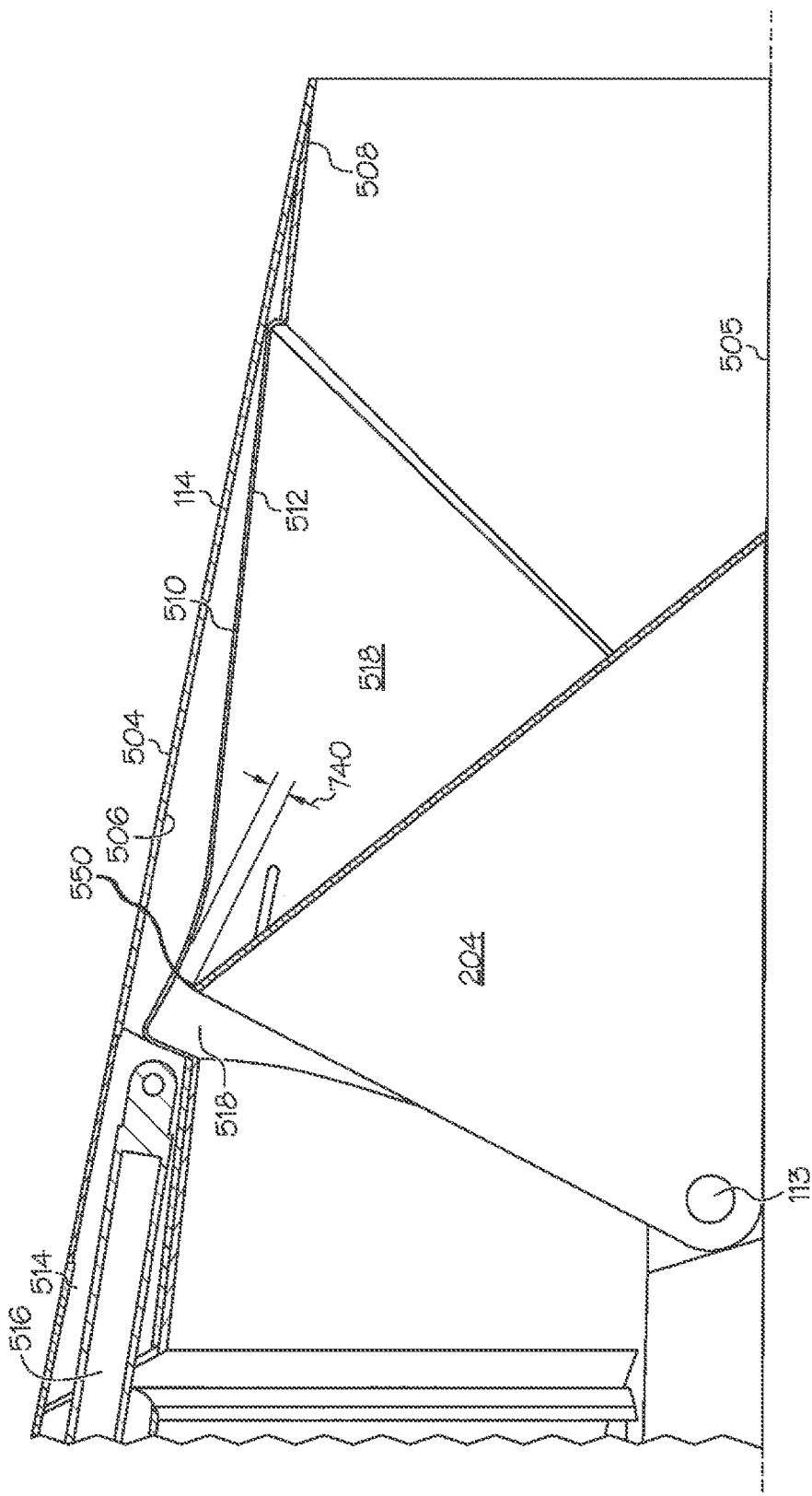
FIG. 7 is a partial cross sectional view, above the thrust reverser centerline, of the composite transcowl in FIG. 5 showing the blocker door in a fully deployed position, in accordance with various embodiments.

The above described rotation of blocker door 204 is partially depicted in the cross sectional views of FIGS. 5-7. In FIG. 5, the blocker door 204 is stowed, in FIG. 6, the blocker door 204 is rotated partially toward deployment, and in FIG. 7 the blocker door 204 is fully rotated (i.e., fully deployed). As can be seen in FIGS. 5-7, during rotation of the blocker door 204, a point 550 on a forward most edge of the blocker door 204 traces out a path that is substantially arcuate. Point 550 is an edge of the blocker door 204, located farthest forward from the pivot axis 113. Due to the combined translational motion of the transcowl and rotational motion of the blocker door, the path of point 550 as observed from the reference frame of transcowl assembly 114 is substantially a sinusoid. The contoured depression 518 is customized in shape, size, and location, to provide clearance for movement of the blocker door during the rotation of the blocker door 204 while minimizing gaps 540, 542, and 740. The contoured depression 518 may be one of a plurality of contoured depressions 518 in the inner skin inner surface 512, the plurality having a number, and each contoured depression 518 of the plurality of contoured depressions 518 is shaped, sized, and oriented to house a respective blocker door of a same number of blocker doors 204 while the blocker door 204 is in the stowed position (FIG. 5). A resultant technical effect of the contoured depressions 518 is to minimize gaps 540 and 542, between transcowl assembly 114 and blocker door 204, so as to provide an aerodynamically smooth flow path for engine exhaust flow 106 when the thrust reverser is stowed. Another technical effect of the contoured depressions 518 is to minimize a gap 740, between transcowl assembly 114 and blocker door 204, so as to prevent gases from leaking through gap 740 when the thrust reverser is deployed.

Figure 8:
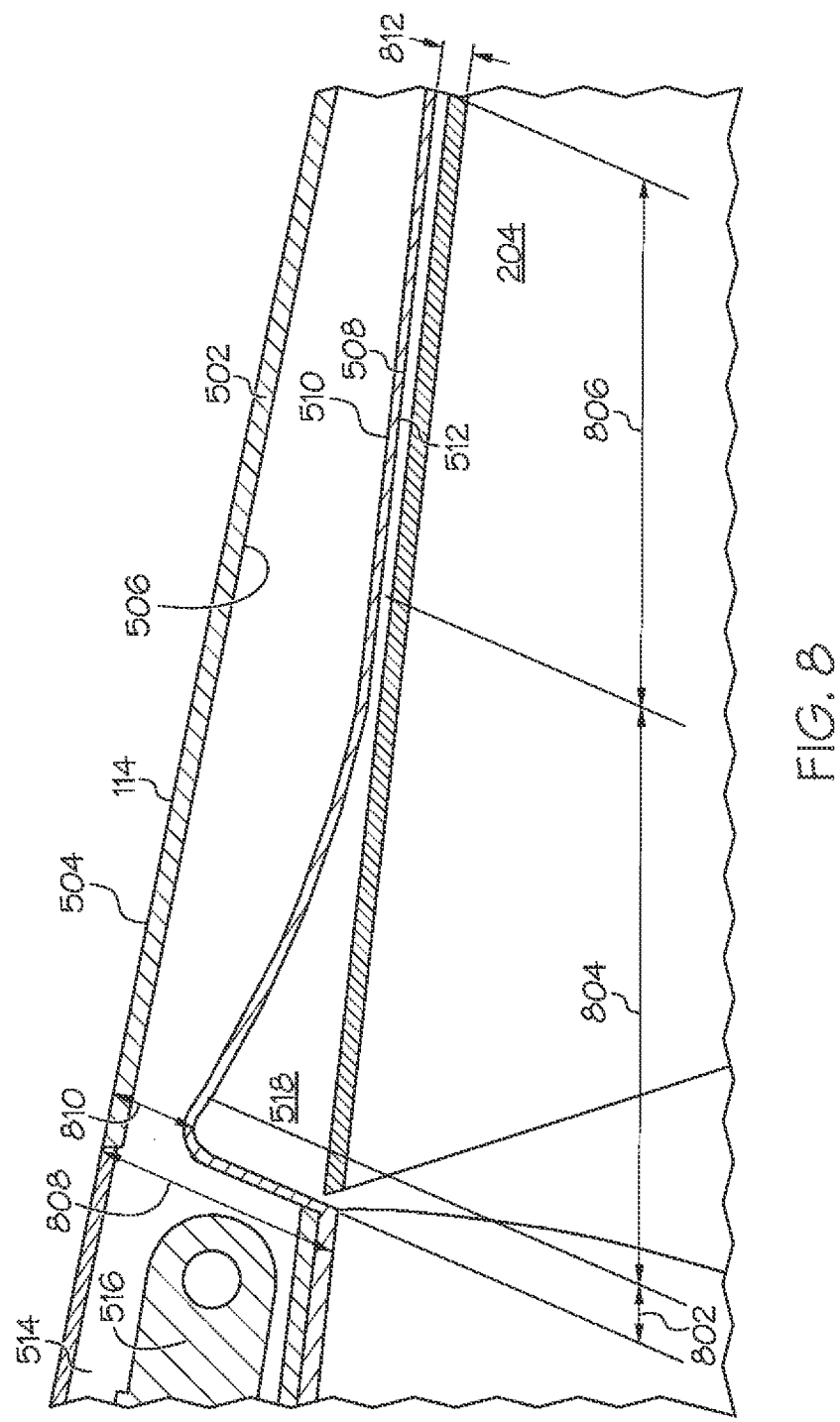
FIG. 8 is an expanded sectional view of the composite transcowl of FIG. 5, showing a contoured depression in the inner skin, in accordance with various embodiments.

FIG. 8 is an expanded sectional view of a portion of the composite transcowl assembly 114, showing the contoured depression 518 of the inner skin 508 in the vicinity of point 550, in accordance with various embodiments. Forward of the blocker door 204, the thickness of the composite transcowl assembly 114 is a first thickness 808; first thickness may comprise one or more from the set including outer skin 502, filler material 532, a metallic bracket 514, and inner skin 508.

With reference to FIGS. 5-7, the sectional view in FIG. 8 depicts the contoured depression 518 at a location customized to accommodate point 550 on the forward most edge of the blocker door 204. In this location, contoured depression 518 has a cross section that is defined by three sequentially abutted sections. A first section 802 is substantially concave and defined forward to aft by a substantially sinusoidal curve. In the first section 802, the contoured depression 518 in the inner skin is the largest, and the resulting thickness of the composite transcowl assembly 114 is a second thickness 810 that is smaller than the first thickness 808. A second section 804 is substantially convex and approximately arcuate forward to aft. A third section 806 is approximately linear, ramping down to at least one portion of the contoured depression 518 having a depth 812 required to provide the clearance for the blocker door 204 while it is stowed. As may be appreciated, depth 812 is based on, and slightly larger than, a thickness of the blocker door 204.

Figure 9:
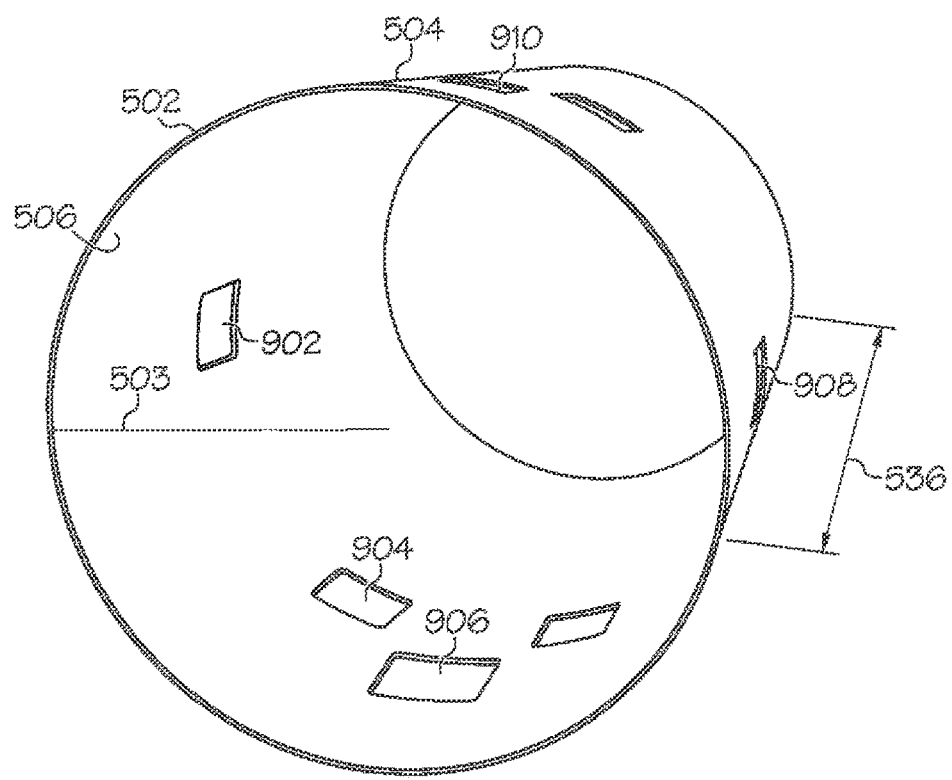
FIG. 9 is a three dimensional view of an outer skin of the composite transcowl, in accordance with various embodiments.
Figure 10:
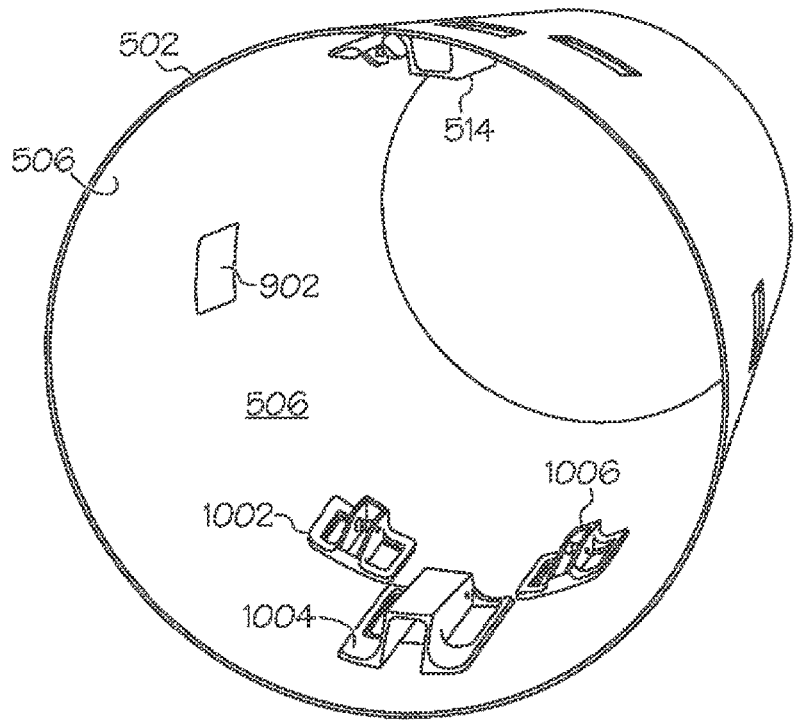
FIG. 10 is a three dimensional view showing the outer skin of FIG. 9 and metallic brackets, in accordance with various embodiments.

Design details of the outer skin 502 are shown in FIG. 9 and FIG. 10. FIG. 9 is a three dimensional view of an outer skin 502 of the composite transcowl, in accordance with various embodiments. The outer skin outer surface 504 provides aerodynamic continuity with a respective nacelle, and is defined by a first radius 503 and a first length 536. As mentioned above, the outer skin 502 is substantially continuous in both a circumferential direction and a longitudinal direction. Openings 902, 904, 906, 908, and 910 extend completely through the outer skin 502 to provide manufacturing or maintenance access. The size and orientation of the openings 902, 904, 906, 908, and 910 are based on application specific requirements.

Turning to FIG. 10, and with reference to FIGS. 5-8, metallic brackets 514, 1002, 1004, and 1006, are disposed between the outer skin inner surface 506 and the inner skin outer surface 510. A technical effect of the metallic brackets 514, 1002, 1004, and 1006, is the stiffening of the composite transcowl assembly 114. The metallic brackets 514, 1002, 1004, and 1006 are configured to (i) attach the outer skin 502 to a thrust reverser actuation system, and (ii) distribute a structural load associated with the thrust reverser actuation system onto the outer skin 502. The metallic brackets 514, 1002, 1004, and 1006 may further be utilized to support or anchor actuators, linkage rods, and the like.

Figure 11:
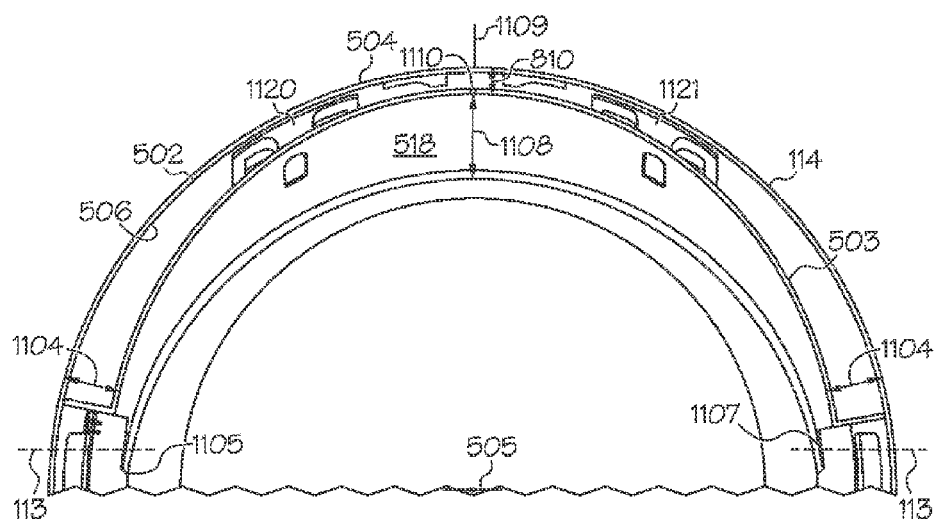
FIG. 11 is a partial cross sectional view, above the thrust reverser centerline, taken at section line E-E of FIG. 5, showing the outer skin, metallic brackets, and inner skin of the composite transcowl, in accordance with various embodiments.

FIG. 11 is a partial cross sectional view taken at section line E-E of FIG. 5, looking forward to aft above the thrust reverser centerline 505, showing the outer skin 502, the metallic brackets 1120 and 1121, and the inner skin 508 of the composite transcowl assembly 114, in accordance with various embodiments. The pivot axis 113 intercepts the composite transcowl assembly 114 at 1105 and 1107. At midpoint 1110, on midplane 1109 at a location farthest from the pivot axis 113, the composite transcowl assembly 114 is the thinnest, with second thickness 810; also at midpoint 1110, the contoured depression 518 depth 1108 is the largest. As can be seen in FIG. 11, moving circumferentially from intercept point 1105 to midpoint 1110, the contoured depression 518 shape changes gradually, providing a smooth arc to midpoint 1110, and carving out a first half of the contoured depression 518. Additionally, moving circumferentially from midpoint 1110 toward intercept point 1107, the contoured depression 518 shape changes gradually, carving out a second half the contoured depression 518 that is a mirror image to the first half the contoured depression 518. Traveling circumferentially, the thickness of the composite transcowl assembly 114 reflects the symmetry of the contoured depression 518, in that it varies from thickness 1104 above intercept point 1105, to a minimum second thickness 810 at midpoint 1110, and back to thickness 1104 above intercept point 1107.

In some embodiments, more than one blocker door 204 may be present. Accordingly, the above design concepts may be extrapolated to describe a respective contoured depression 518 in the inner skin 508 for each blocker door 204 of the more than one blocker doors 204. For example, each blocker door 204 will pivot upon a respective pivot axis, and have a respective point 550 on the forward most edge of the blocker door 204. For each blocker door 204, a respective contoured depression 518 is customized as described above, in location and shape, to accommodate the blocker door 204. As mentioned above, in some embodiments, the inner skin 508 comprises two or more segments. In some embodiments, each segment of the two or more segments may comprise a contoured depression 518, and the combination of the two or more segments is configured to provide, for each blocker door 204 of two or more blocker doors, a respective contoured depression 518 providing clearance for movement for the respective blocker door 204.

FIG. 12 is a three dimensional view showing an assembly of the composite transcowl assembly 114 in accordance with various embodiments. With reference to FIG. 9, openings 902, 908, and 910 are illustrated, showing the mechanical or maintenance access that they provide. Area 1202 indicates a location that may accommodate a metallic bracket and/or associated support beams of the stationary structure 108. Inner skin 508 comprises at least two segments, as indicated by seam 1206. In some embodiments, a heat shield 1204 may be installed in various locations forward of the blocker doors. For example, a heat shield 1204 may be coupled to the inner skin inner surface 512 or to the outer skin inner surface 506 via adhesives or mechanical fasteners.

Figure 13:
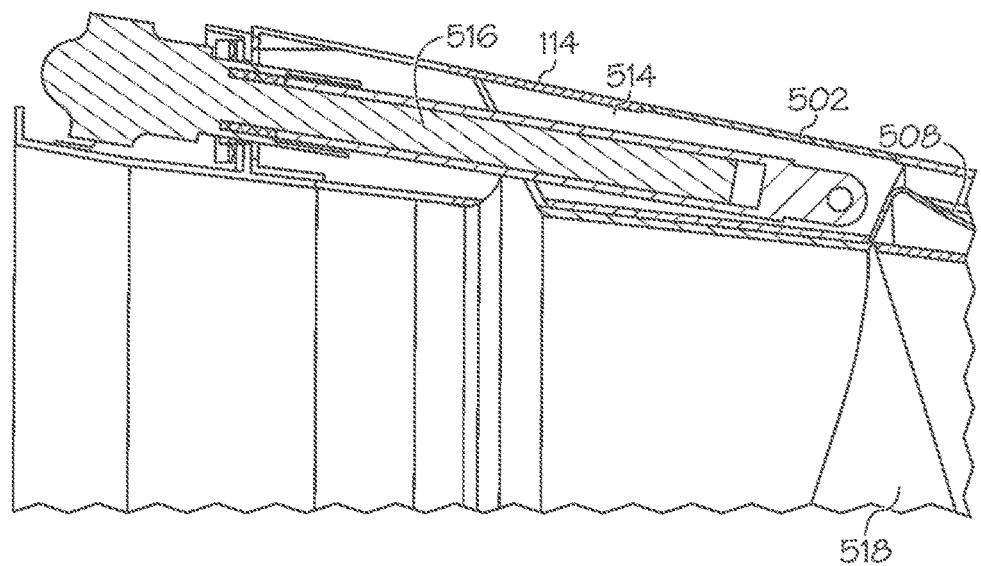
FIG. 13 is a partial cross sectional view showing placement of a metallic bracket used in association with an actuator, in accordance with various embodiments.

Turning now to FIG. 13 and FIG. 14, and with reference back to FIG. 10, the metallic brackets are configured to (i) attach the outer skin 502 to a thrust reverser actuation system, and (ii) distribute a structural load associated with the thrust reverser actuation system onto the outer skin 502. For example, In FIG. 13 a metallic bracket 514 used in association with an actuator 516 is depicted, and in FIG. 14, a metallic bracket 1002 used in association with the linkage rod 1402 is depicted.

Thus there has been provided an improved transcowl design, specifically, a customized composite transcowl assembly delivering the technical effects of meeting performance requirements while delivering reduced weight. A person with skill in the art will readily appreciate that a variety of other embodiments may be utilized to provide the intended functionality without straying from the scope of the invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. Any process steps may be interchanged in any order without departing from the scope of the invention as long as such an interchange does not contradict the claim language and is not logically nonsensical. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Some of the embodiments and implementations are described above in terms of functional and/or logical block components or modules. However, it should be appreciated that such block components (or modules) may be realized by any number of hardware, software, and/or firmware components configured to perform the specified functions. To clearly illustrate this interchangeability of hardware and software, these illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

What is claimed is:

1. A translating cowl (transcowl) assembly for a thrust reverser system for a turbine engine, the transcowl assembly creating a continuous cavity having a longitudinal extent for engine exhaust flow, and comprising:
    an outer skin having the longitudinal extent of the transcowl assembly and comprised of a first composite material, the outer skin further comprising the characteristics of (i) being substantially continuous in both a circumferential direction and a longitudinal direction, (ii) an outer skin outer surface providing aerodynamic continuity with a nacelle, and (iii) an outer skin inner surface;
    an inner skin having the longitudinal extent of the transcowl assembly and comprised of a second composite material and configured to provide an aerodynamic exit flow path for engine exhaust, the inner skin further comprising the characteristics of (i) an inner skin outer surface configured to couple circumferentially and longitudinally with the outer skin inner surface, (ii) an inner skin inner surface comprising a contoured depression configured to provide clearance for forward to aft movement of a forward edge of a blocker door as it is rotated to a deployed position;
    the blocker door rotatably mounted within the inner skin at a first intercept point and a second intercept point, the first intercept point and second intercept point forming a pivot axis that is perpendicular to an engine centerline; and
    when viewing a cross sectional plane drawn through the pivot axis and perpendicular to the engine centerline, the contoured depression in the inner skin is a smooth arc between intercepts, and the transcowl assembly is thinnest at a midpoint between the intercepts, and thickest at the intercepts;
    the contoured depression having a longitudinal cross-section comprising three sequentially abutted sections: a first section that is substantially concave in a radially outward direction forward to aft; a second section that is substantially convex forward to aft; and a third section that is approximately linear forward to aft; and thickest at the intercepts;
    a metallic bracket disposed between the outer skin inner surface and the inner skin outer surface, and configured to (i) attach the outer skin to a thrust reverser actuation system, and (ii) distribute a structural load associated with the thrust reverser actuation system onto the outer skin.

2. The transcowl assembly of claim 1, wherein the blocker door is one of two or more blocker doors, and wherein the inner skin comprises, for each blocker door of the two or more blocker doors, a respective contoured depression configured to provide clearance for movement of the blocker door.

3. The transcowl assembly of claim 1, wherein the inner skin comprises two or more segments abutted circumferentially.

4. The transcowl assembly of claim 3, wherein the blocker door is one of two or more blocker doors, and wherein each segment of the two or more segments comprise a contoured depression, and the two or more segments provide, for each blocker door of two or more blocker doors, a respective contoured depression.

5. The transcowl assembly of claim 1, further comprising a metallic heat shield attached to the outer skin inner surface or the inner skin inner surface.

6. The transcowl assembly of claim 1, wherein, forward of the blocker door, the transcowl assembly comprises a first thickness, and in the first section the transcowl assembly comprises a second thickness, less than the first thickness.

7. The transcowl assembly of claim 6, wherein, in the third section, the contoured depression further comprises a portion with a depth that is based on a thickness of the blocker door.

8. The transcowl assembly of claim 1, wherein, when viewing the cross-sectional plane through the intercepts and perpendicular to the engine centerline, the contoured depression is symmetrical with respect to a plane through the midpoint and perpendicular to the engine centerline.

9. A thrust reverser system for a turbine engine, the thrust reverser system comprising:
    a composite translating cowl (transcowl) assembly having a transcowl length, providing an aerodynamic exit flow path for engine exhaust and including:
    (1) an annular outer skin extending the transcowl length and comprised of a first composite, the outer skin further comprising the characteristics of (i) being substantially continuous in both a circumferential direction and a longitudinal direction, (ii) an outer skin outer surface providing aerodynamic continuity with a nacelle, and (iii) an outer skin inner surface;
    (2) a non-structural inner skin comprised of a second composite installed to extend circumferentially and longitudinally within the outer skin inner surface, the inner skin further comprising an inner skin inner surface comprising a contoured depression; and
    a blocker door rotatably mounted within the inner skin, at a first intercept point and a second intercept point, the first intercept point and second intercept point forming a pivot axis that is perpendicular to an engine centerline;

and when viewing a cross sectional plane drawn through the pivot axis and perpendicular to the engine centerline, the contoured depression in the inner skin is a smooth arc between intercepts, and the transcowl assembly is thinnest at a midpoint between the intercepts, and thickest at the intercepts;

the contoured depression having a longitudinal cross-section comprising three sequentially abutted sections: a first section that is substantially concave in a radially outward direction forward to aft; a second section that is substantially convex forward to aft; and a third section that is approximately linear forward to aft; and thickest at the intercepts;

and wherein the contoured depression is configured to house the blocker door when the blocker door is in a stowed position, thereby providing a smooth aerodynamic exit flow path and further shaped to provide forward to aft movement clearance for a forward-most edge of the blocker door as the blocker door rotates into a deployed position; and a metallic bracket disposed between the outer skin inner surface and the inner skin outer surface, and configured to attach the outer skin to a thrust reverser actuation system that is external to the transcowl assembly.

10. The transcowl assembly of claim 9, wherein, forward of the blocker door, the transcowl assembly comprises a first thickness; wherein the contoured depression has a longitudinal cross-section comprising three sections, a first section, a second section, and a third section, the three sections sequentially abutted forward to aft, and the first section the transcowl assembly comprises a second thickness, less than the first thickness.

11. The transcowl assembly of claim 10, wherein, in the third section, the contoured depression comprises a portion with a thickness that is based on a thickness of the blocker door.

12. The transcowl assembly of claim 10, wherein the blocker door is one of two or more blocker doors, and wherein the inner skin comprises, for each blocker door of the two or more blocker doors, a respective contoured depression configured to provide clearance for movement of the blocker door.

13. The transcowl assembly of claim 10, wherein the inner skin comprises two or more segments abutted circumferentially or longitudinally.

14. The transcowl assembly of claim 13, wherein the blocker door is one of two or more blocker doors, and wherein each segment of the two or more segments comprise a contoured depression, and the two or more segments provide, for each blocker door of two or more blocker doors, a respective contoured depression.

15. The transcowl assembly of claim 14, further comprising a metallic heat shield coupled to the transcowl assembly.

* * * * *